(12) United States Patent
Mykytiuk

(10) Patent No.: US 11,878,922 B2
(45) Date of Patent: Jan. 23, 2024

(54) ACTIVE SUBSTANCE FOR SEWAGE TREATMENT AND DEWATERING OF SOLID DOMESTIC WASTES LANDFILLS

(71) Applicant: Unique Equipment Solutions LLC, Littleton, MA (US)

(72) Inventor: Oleksandr Yuriiovych Mykytiuk, Kyiv (UA)

(73) Assignee: Unique Equipment Solutions LLC, Littleton, MA (US)

( * ) Notice: Subject to any disclaimer, the term of this patent is extended or adjusted under 35 U.S.C. 154(b) by 164 days.

(21) Appl. No.: 16/651,573

(22) PCT Filed: Sep. 28, 2018

(86) PCT No.: PCT/UA2018/000110
§ 371 (c)(1),
(2) Date: Mar. 27, 2020

(87) PCT Pub. No.: WO2019/066764
PCT Pub. Date: Apr. 4, 2019

(65) Prior Publication Data
US 2020/0231475 A1 Jul. 23, 2020

(30) Foreign Application Priority Data
Sep. 29, 2017 (UA) ................ a 2017 09564

(51) Int. Cl.
| | |
|---|---|
| *C02F 1/48* | (2023.01) |
| *C02F 11/143* | (2019.01) |
| *B09B 3/00* | (2022.01) |
| *C02F 1/30* | (2023.01) |
| *C02F 1/32* | (2023.01) |
| *C02F 1/50* | (2023.01) |
| *C02F 1/72* | (2023.01) |
| *C02F 101/00* | (2006.01) |
| *C02F 101/20* | (2006.01) |
| *C02F 101/30* | (2006.01) |
| *C02F 103/00* | (2006.01) |

(52) U.S. Cl.
CPC ............ *C02F 1/487* (2013.01); *B09B 3/00* (2013.01); *C02F 1/30* (2013.01); *C02F 1/32* (2013.01); *C02F 1/50* (2013.01); *C02F 1/722* (2013.01); *C02F 11/143* (2019.01); *C02F 2101/006* (2013.01); *C02F 2101/20* (2013.01); *C02F 2101/30* (2013.01); *C02F 2103/007* (2013.01); *C02F 2303/20* (2013.01)

(58) Field of Classification Search
CPC ...... C02F 1/72; C02F 1/32; C02F 1/30; C02F 1/50; C02F 11/14; B09B 3/00
See application file for complete search history.

(56) References Cited

U.S. PATENT DOCUMENTS
2003/0057107 A1  3/2003  Igarashi

FOREIGN PATENT DOCUMENTS
| | | |
|---|---|---|
| CN | 201240902 Y | 5/2009 |
| CN | 107244723 A * | 10/2017 |
| RU | 2209854 C2 | 8/2003 |

OTHER PUBLICATIONS

Flocculating Agent For Removing Colloidally Dispersed Solids From Industrial Drinking And Waste Water And For Dewatering . . . DE 19828467 A1 Date Published Dec. 30, 1999 (Year: 1998).*
WO 02083297 A1 Date Published Oct. 24, 2002, Nventor Information Highly Porous Particle For Managing And Treating Animal Waste Pool . . . (Year: 2002).*
N.E. Krutchinina et al., Titanium coagulant for water purification and water treatment processes, Advances in Chemistry and Chemical Technology, vol. 30, 2016, No. 9, pp. 84-86.
L.A. Kulskii, P.P. Strokach, "Natural water purification technology", second edition, revised and enlarged—Kiev: Vishcha shk. Leading publishing house, 1986, pp. 54-79.
Jiang J. "The role of coagulation in water treatment", Current opinion in chemical engineering 2015, 8:36-44.
J. Rodriguez, S. Stopic, G. Krause, B. Friedrich, "Feasibility assessment of electrocoagulation towards a new sustainable wastewater treatment", Env Sci Pollut Res 14 (7) 477-482 (2007).
E. Butler, Y.-T. Hung, R.Y.-L. Yeh, M. Suleiman Al Ahmad, "Electrocoagulation in wastewater treatment", Water 2011, 3,495-525.
A. Baeza, M. Fernandez, M. Herranz, F. Legarda, C. Mird, A. Salas, "Removing uranium and radium from a natural water", Water, air and soil pollution 2006,173:57-69.

* cited by examiner

*Primary Examiner* — Walter D. Griffin
*Assistant Examiner* — Cameron J Allen
(74) *Attorney, Agent, or Firm* — Loginov & Associates, PLLC; William A. Loginov

(57) ABSTRACT

The present invention relates to an active substance for sewage treatment and dewatering of solid domestic wastes landfills. Besides, the present invention also relates to a method for producing this active substance. More specifically, the present invention relates to use of this active substance for sewage treatment and dewatering of solid domestic wastes landfills to remove organic impurities, organogenic elements, solid and radioactive metals.

6 Claims, No Drawings

ACTIVE SUBSTANCE FOR SEWAGE TREATMENT AND DEWATERING OF SOLID DOMESTIC WASTES LANDFILLS

FIELD OF THE INVENTION

The present invention relates to an active substance for sewage treatment and dewatering of solid domestic wastes landfills. Besides, the present invention also relates to a method for producing this active substance. More specifically, the present invention relates to use of this active substance for sewage treatment and dewatering of solid domestic wastes landfills to remove organic impurities, organogenic elements, solid and radioactive metals.

BACKGROUND OF THE INVENTION

A closest prior art of the active substance for water treatment is a filtering material for treatment of drinking water and milk, which is produced using milled wastes of machining and other industries, the material is characterized in that it comprises a mixture of titanium (Ti) and saponite powders, (in % of weight particles) titanium 40 and saponite 60 having a particle size of 0.1+0.063 mm, the chemical composition of the saponite (in % of weight particles) is the following: Mg—12.136±1.470; Al—7.613±0.395; Si—31.164±0.575; Ca—11.974±0.213; Ti—1.778±0.058; V—0.051±0.021; Cr—0.041±0.010; Mn—0.621±0.023; Fe—33.389±0.591; Cu—0.073±0.005; Zn—0.066±0.004; Sr—0.050±0.004; Zr—0.043±0.004; Ni—1.001±0.06, and the produced mixture is pressed by a method of quasistatic pressing (UA 103499 U).

The active substance for sewage treatment and dewatering of solid domestic wastes landfills differs from the closest prior art in that the active substance soaks ions and molecules of heavy and radioactive metals, organic molecules and oxidizes them on its surface with ions $OH^-$ and/or $O^-$, which are also formed on the active substance surface from water and/or hydrogen peroxide molecules through the exposure to light waves energy in the infrared, ultraviolet and visible ranges, and this active substance decomposes the water and/or hydrogen peroxide molecules into ions $OH^-$ and/or $O^-$ thereby forming oxygen molecules.

Further difference of the active substance for sewage treatment and dewatering of solid domestic wastes landfills lies in that the fractional composition of this active substance is from 5 to 200 microns and particles are petal-shaped with a developed surface, wherein mesopores and micropores are highly developed.

The structure of the active substance is amorphous and soft, and it maintains its properties in a form of a water suspension only.

SUMMARY OF THE INVENTION

The present invention is aimed at provision of an active substance for sewage treatment and dewatering of solid domestic wastes landfills to remove organic impurities, organogenic elements, solid and radioactive metals.

The inventors have revealed that this active substance soaks ions and molecules of heavy and radioactive metals, organic molecules and oxidizes them on its surface with ions $OH^-$ and/or $O^-$, which are also formed on the active substance surface from water and/or hydrogen peroxide molecules through the exposure to light waves energy in the infrared, ultraviolet and visible ranges. This active substance also decomposes the water and/or hydrogen peroxide molecules into ions $OH^-$ and/or $O^-$ thereby forming oxygen molecules.

The present invention also provides a method for producing this active substance for sewage treatment and dewatering of solid domestic wastes landfills. Another purpose of the present invention lies in use of this active substance for sewage treatment and dewatering of solid domestic wastes landfills to remove organic impurities, organogenic elements, solid and radioactive metals.

Other advantages and embodiments of the present invention will be clear from the description stated hereinafter.

DETAILED DESCRIPTION OF THE INVENTION

According to the present invention, an active substance for sewage treatment and dewatering of solid domestic wastes landfills to remove organic impurities, organogenic elements, solid and radioactive metals, has been unexpectedly produced.

According to the present invention, this active substance is able to soak ions and molecules of heavy and radioactive metals, organic molecules and oxidizes them on its surface with ions $OH^-$ and/or $O^-$, which are also formed on the active substance surface from water and/or hydrogen peroxide molecules through the exposure to light waves energy in the infrared, ultraviolet and visible ranges. It decomposes the water and/or hydrogen peroxide molecules into ions $OH^-$ and/or $O^-$ thereby forming oxygen molecules.

This active substance comprises from 10% to 80% of aluminum, and/or from 0.5% to 10% of titanium, and/or from 10% to 80% of iron, and/or from 1% to 5% of sodium, and/or from 1% to 20% of copper, and/or from 1% to 80% of tin, and/or from 20% to 40% of oxygen, and/or from 1% to 2% of hydrogen together, or metals in any combination with mandatory inclusion of aluminum and titanium, preferably including sodium, to the active substance composition. A mean fraction size of the active substance is from 5 to 200 microns. The particles are petal-shaped with a developed surface, wherein mesopores and micropores are highly developed.

A method for producing the active substance for sewage treatment and dewatering of solid domestic wastes landfills comprises dissolving raw materials (scrap of the corresponding metals) in fresh or sea water through the exposure to high-voltage electromagnetic impulses in a specially designed chamber with two or more electrodes followed by a self-maintained combining of ions of metals, oxygen and hydrogen ions into complex molecules. The electromagnetic impulses are generated by a direct current power source having a voltage of from 220 volts to 5000 volts, a current strength in the impulse of from 100 microamperes to 2000 amperes, with an impulse repetition frequency of from 20 Hz to 3 kHz.

The active substance is used for sewage treatment and dewatering of solid domestic wastes landfills to remove organic impurities, organogenic elements, solid and radioactive metals. This active substance is also used for open waters treatment to remove ions of heavy and radioactive metals, organogenic elements and organic impurities, and for open waters treatment and water-accumulating stations to prevent overgrowing of blue-green and other microalgae. This active substance is also used for treatment of metal and non-metal surfaces to remove overlaying of hardness salts and organic substances.

Therefore, this active substance for sewage treatment and dewatering of solid domestic wastes landfills to remove organic impurities, organogenic elements, solid and radioactive metals, may be used both alone and in combination with other substances for sewage treatment and dewatering of solid domestic wastes landfills.

The invention claimed is:

1. A method for using an active substance for water treatment, wherein the active substance comprises an active substance composition including components that comprise from 10% to 80% of aluminum and from 0.5% to 10% of titanium, and at least one of iron, sodium, copper, tin, oxygen, and hydrogen, in any combination that provides 100% of the active substance composition, and wherein the active substance composition is provided in particles in a size from 5 to 200 microns, the method comprising:
 providing a chamber with two or more electrodes that receives fresh water or sea water; and
 providing the components to the chamber as scrap raw materials, and dissolving the scrap raw materials in the chamber while exposing the fresh water or sea water and the scrap raw materials to high-voltage electromagnetic impulses at the two or more electrodes,
 whereby ions of metals, oxygen and hydrogen ions are thereby combined into complex molecules in a self-maintained reaction.

2. The method of claim 1, further comprising, using the active substance composition to soak ions and molecules of heavy and radioactive metals or organic molecules in the fresh water or sea water, including exposing the fresh water or sea water and the active substance composition to energy of light waves in the infrared, ultraviolet and visible ranges.

3. The method of claim 1, further comprising, generating the electromagnetic impulses by a direct current power source having a voltage of from 220 volts to 5000 volts, a current strength in the impulse of from 100 microamperes to 2000 amperes, with an impulse repetition frequency of from 20 Hz to 3 kHz.

4. The method of claim 1, further comprising providing the fresh water or sea water to the chamber from a solid domestic waste landfill, whereby organic impurities, organogenic elements, solid and radioactive metals are removed therefrom.

5. The method of claim 1, further comprising, providing the fresh water or sea water to the chamber from an open water source, whereby ions of heavy and radioactive metals, organogenic elements and organic impurities are removed therefrom.

6. The method of claim 1, further comprising, providing the fresh water or sea water to the chamber from an open water source or a water-accumulating station, whereby overgrowing of blue-green and other microalgae is prevented therein.

\* \* \* \* \*